A. A. WEST.
GAME APPARATUS.
APPLICATION FILED AUG. 11, 1908.
932,206.   Patented Aug. 24, 1909.
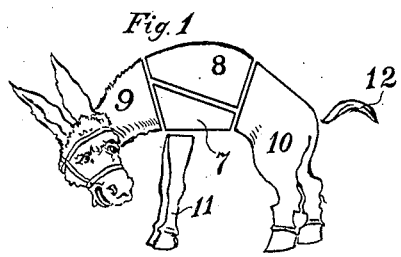
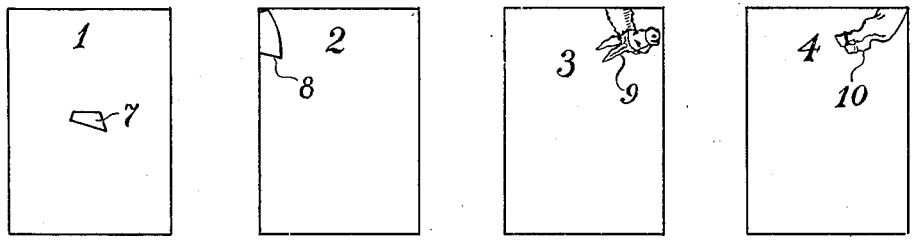
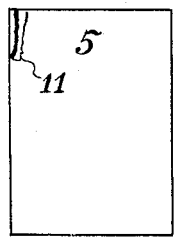
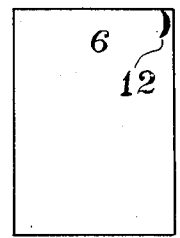
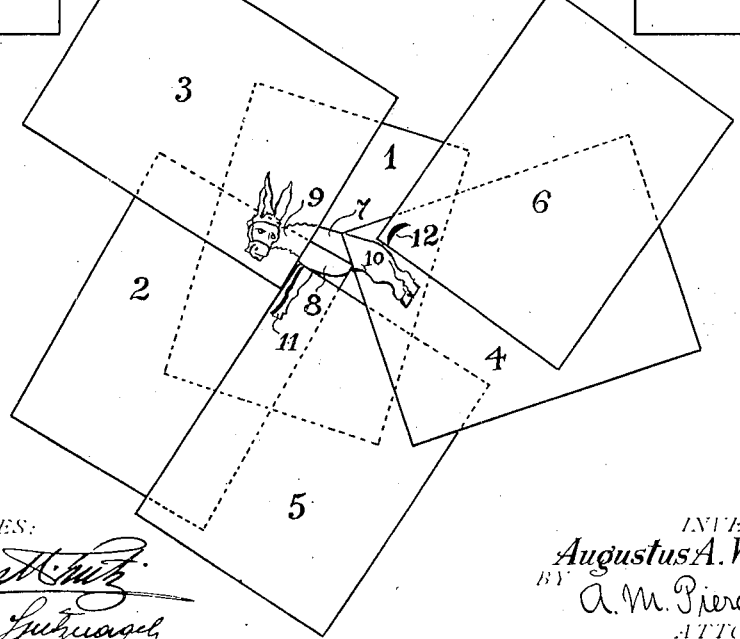
WITNESSES:
INVENTOR.
Augustus A. West,
BY A. M. Pierce,
ATTORNEY.

UNITED STATES PATENT OFFICE.

AUGUSTUS A. WEST, OF BROOKLYN, NEW YORK.

GAME APPARATUS.

932,206.  Specification of Letters Patent.  Patented Aug. 24, 1909.

Application filed August 11, 1908. Serial No. 447,961.

*To all whom it may concern:*

Be it known that I, AUGUSTUS A. WEST, a citizen of the United States, residing at Brooklyn, in the county of Kings and State of New York, have invented certain new and useful Improvements in Game Apparatus, of which the following is a specification, reference being had therein to the accompanying drawing.

My invention relates especially to that class of game devices and puzzles wherein a series of cards is employed, and has for its object the provision of an effective apparatus.

To attain the desired end, my invention consists essentially in a series of cards, each bearing a representation of a portion of an animal or object, printed, stamped or painted thereon, said cards being adapted to be brought together, and so arranged as to form a complete representation of such animal or object; and my invention also involves certain other novel and useful combinations or arrangements of parts, and peculiarities of operation, all of which will be hereinafter first fully described, and then pointed out in the claims.

In the drawing, Figure 1 is a view of an animal in outline, as embodied in my game apparatus. Fig. 2 is a representation of a series of cards of my apparatus. Fig. 3 illustrates the cards as placed together, the animal being in a different position from that shown in Fig. 1.

Similar numerals of reference, wherever they occur, indicate corresponding parts in all the figures.

1, 2, 3, 4, 5 and 6 are the series of cards. 7, 8, 9, 10, 11 and 12 are the different parts of the animal depicted thereon by printing, stamping, painting, or by any of the well known methods. Duplicate sets of each of the series of cards may be produced, each set having its own distinguishing color, and a game played in the manner of the "Authors game", the cards being shuffled and dealt, six to each player. When, by the drawing of each player in turn, any player has obtained a complete series of six cards of a uniform color, and displays the same duly placed together, as in Fig. 3 of the drawing, so as to form a complete animal, he is declared to be the winner.

By reason of the peculiar arrangement of the parts representing the animal, the cards may be assembled in numerous ways, each assembling forming a complete animal, although the parts occupy positions differing from either of those shown in the drawing.

By making a portion of the body of the object of a shape having three equal sides extending at oblique angles to each other, and a side curved in the outline of a portion of the body, and dividing said portion of the body obliquely, forming the parts 7 and 8, I produce such a configuration as will adapt itself to the several other parts of the object in producing the variations in the position of the object when assembled.

Having now fully described my invention, what I claim as new therein and desire to secure by Letters Patent, is:

1. A game apparatus consisting of a series of cards each bearing a representation of a portion of the same object printed, stamped or painted thereon, said representations being so shaped and located that, when the cards are brought together in different relations, they form complete representations of such object in different positions.

2. In a game apparatus, a series of cards wherein a different portion of a picture of the same object is printed, stamped or painted upon each card, two portions, 7 and 8, forming the body of the pictured object and having each three sides at oblique angles to each other, the remaining side of one being straight and of the other curved in the outline of a portion of the body, said cards when brought together forming representations of such body in different positions.

In testimony whereof I hereto affix my signature in presence of two witnesses.

AUGUSTUS A. WEST.

Witnesses:
 LOUIS F. BRAUN,
 A. M. PIERCE.